No. 813,566. PATENTED FEB. 27, 1906.
W. R. MARTIN.
EXCAVATOR.
APPLICATION FILED JULY 29, 1905.

3 SHEETS—SHEET 2.

Witnesses

William R. Martin,
Inventor.
by C. A. Snow & Co.
Attorneys

No. 813,566. PATENTED FEB. 27, 1906.
W. R. MARTIN.
EXCAVATOR.
APPLICATION FILED JULY 29, 1905.
3 SHEETS—SHEET 3.
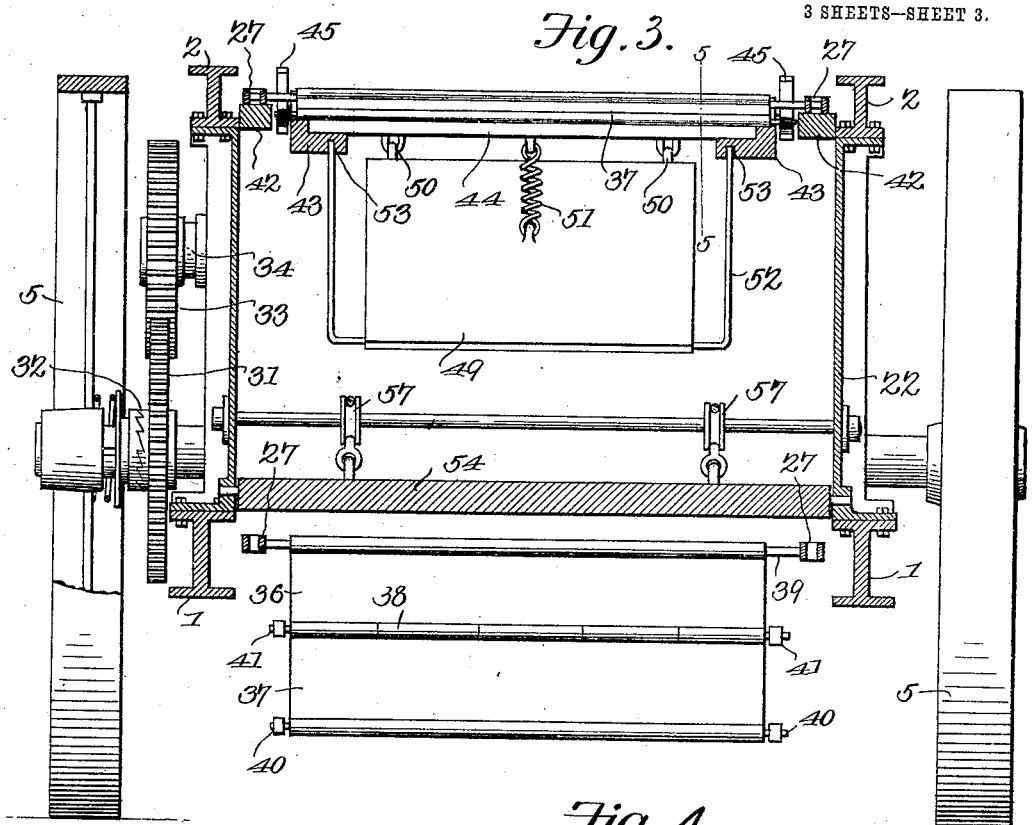
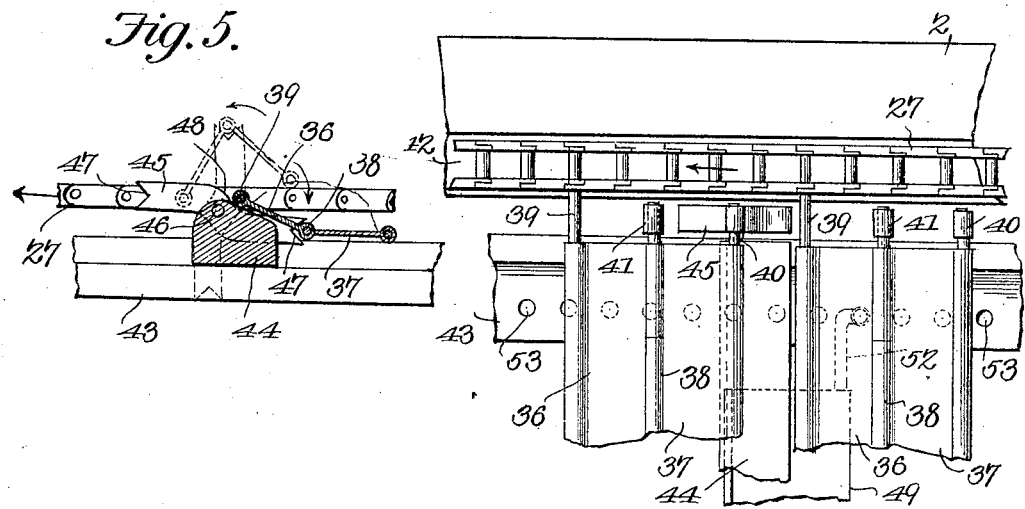
Witnesses
William R. Martin, Inventor
by C. A. Snow & Co.
Attorneys

UNITED STATES PATENT OFFICE.

WILLIAM R. MARTIN, OF IDAHO FALLS, IDAHO.

EXCAVATOR.

No. 813,566.  Specification of Letters Patent.  Patented Feb. 27, 1906.

Application filed July 29, 1905. Serial No. 271,799.

*To all whom it may concern:*

Be it known that I, WILLIAM R. MARTIN, a citizen of the United States, residing at Idaho Falls, in the county of Bingham and State of Idaho, have invented a new and useful Excavator, of which the following is a specification.

This invention relates to excavators, and has for its object to provide an improved machine of this character which is especially adapted for grading purposes. It is also proposed to have the machine collect and carry the earth as it is loosened and picked up by the shovel and also to effect dumping or discharging of the excavated earth whenever desired in a very simple and efficient manner.

Further objects of the invention reside in the provision of novel means for conveying the excavated earth from the shovel to the box or compartment for containing the excavated earth, to provide for the prompt and effective discharging or dumping of the earth from the conveyer into the box or compartment in an automatic manner without stopping the operation of the conveyer, to provide for conveniently stopping and starting the conveyer, and to effect the convenient dumping of the earth from the box or receptacle which contains the same.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
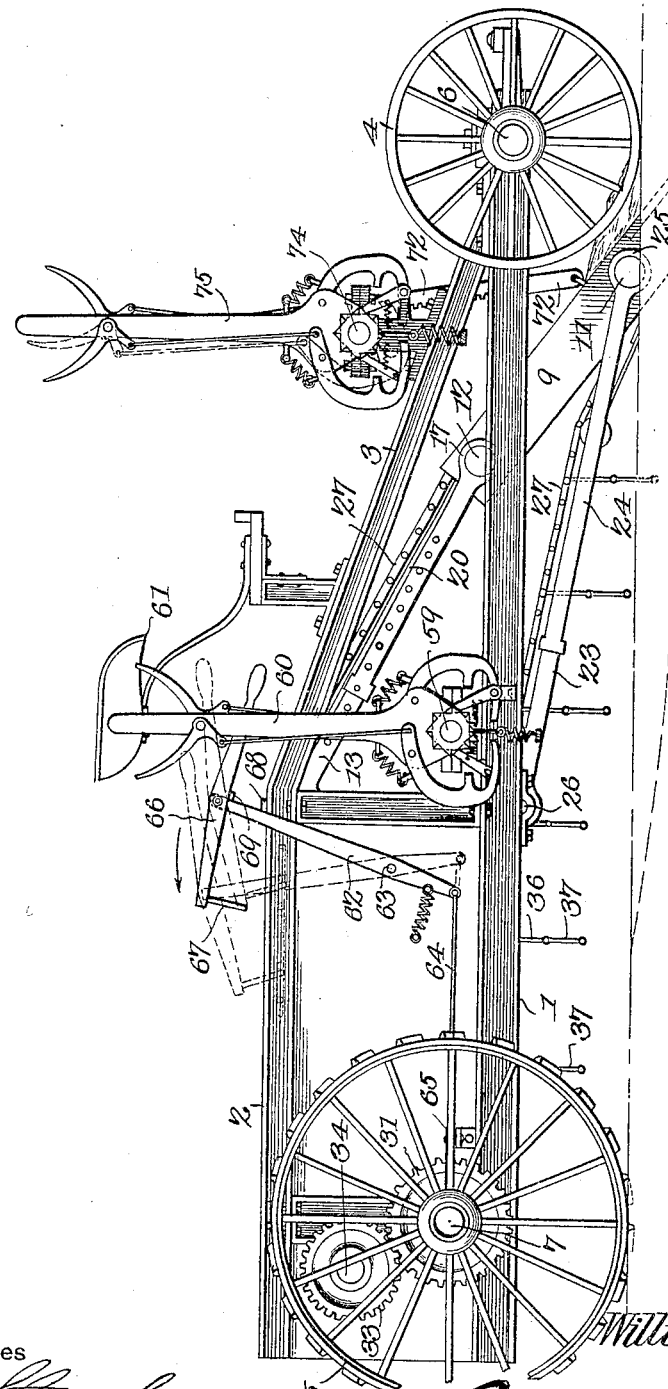
Figure 2:
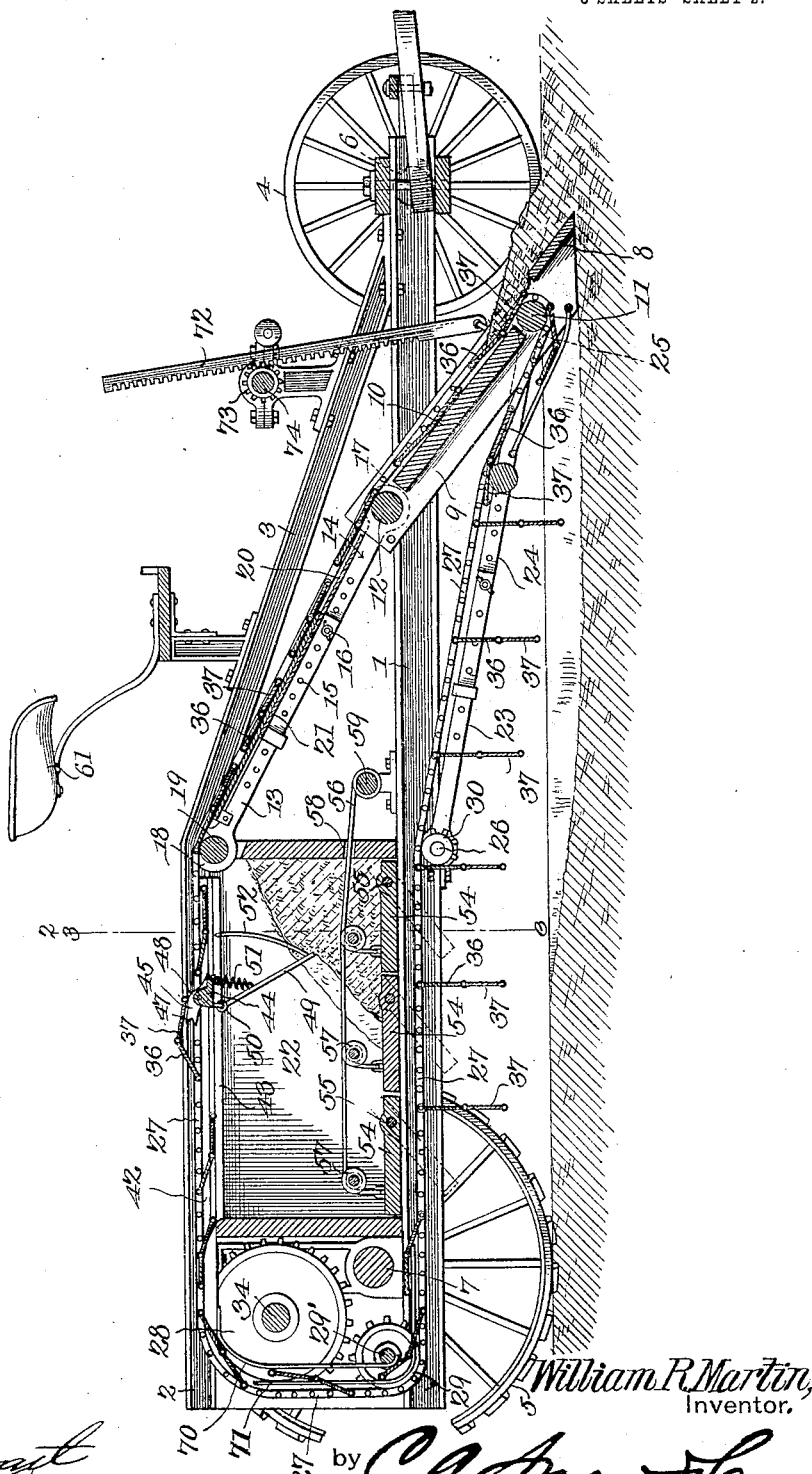

In the accompanying drawings, Figure 1 is a side elevation of a grading-machine embodying the features of the present invention. Fig. 2 is a longitudinal sectional view thereof. Fig. 3 is an enlarged cross-sectional view on the line 3 3 of Fig. 2. Fig. 4 is an enlarged fragmentary plan view of the conveyer-dumping mechanism. Fig. 5 is a detail sectional view taken on the line 5 5 of Fig. 3.

Like characters of reference designate corresponding parts in each and every figure of the drawings.

The frame of the present machine includes opposite longitudinal bottom sills or frame-beams 1, preferably in the nature of I-beams, upper rear longitudinal frame-beams 2, and downwardly and forwardly inclined frame-beams 3, leading from the front ends of the upper beams 2 to the forward ends of the lower beams 1. For the support of this frame there are front and rear ground-wheels 4 and 5, mounted upon suitable axles 6 and 7, the front wheels being smooth and the rear wheels rough-shod, so as to prevent slipping of the latter as power is taken from the rear axle for driving the conveyer mechanism of the machine.

Between the front portions of the sides of the frame of the machine and immediately in rear of the front axle there is a shovel or scraper 8, which is provided at each side with a rearwardly and upwardly inclined arm 9, there being a platform or plate 10 extending between and carried by the two arms of the scraper. The plate or platform 10 is spaced in rear of the scraper 8, and in this space is located a roller 11, there being another roller 12 extending between and connecting the upper ends of the arms 9 above the plate or platform 10. These rollers are designed for supporting and guiding the conveyer, as will be hereinafter explained. The upper rear end of each arm 9 is connected to the adjacent side of the frame of the machine by means of a pair of overlapped and slidably-connected bars 13 and 14, which are provided with longitudinal series of perforations 15 for engagement by a suitable fastening 16 to adjustably connect the bars. The lower end of the bar 14 is provided with an eye 17, which receives one end of the roller 12, while the upper end of the bar 13 is provided with an eye 18, receiving the adjacent end of a roller 19, journaled across the top of the frame substantially at the points of meeting of the frame-bars 2 and 3. A plate or platform 20 is carried by the lower bars 14, and a similar plate or platform 21 is carried by the upper arms 13, so as to overlap the platform 20, and thereby form a support for the conveyer between the platform 10 and the front portion of the open top of the box or receptacle 22 for the reception of the excavated earth. For the further support of the lower portion of the scraper there is provided at each side thereof a pair of overlapped adjustably-connected bars 23 and 24, similar to the bars 13 and 14. The lower end of each bar 24 is provided with an eye 25, receiving one end of the roller 11, the upper end of the other bar 23 being suitably connected to the adjacent frame-bar 1 in any suitable manner—as, for instance, by being pierced by a shaft or bar 26, supported by the frame.

The conveyer mechanism for carrying the excavated earth from the scraper to the receptacle 22 includes a pair of spaced sprocket-chains 27, which travel around the rollers 11, 12, and 19, across the open top of the receptacles 22, around a drive-sprocket 28, thence downwardly and forwardly around an idle sprocket or roller 29, beneath the receptacle 22, and across the sprocket or roller 30 to the roller 11, which is carried by the scraper. These sprocket-chains are driven from the rear axle 7 by means of a gear 31, loose upon the axle and controlled by suitable clutch mechanism 32 to interlock the gear with the axle. Another gear 33 meshes with the gear 31 and is carried by a shaft 34, which extends transversely across the machine and carries one of the sprocket-wheels 28 at each end thereof, with which the sprocket-chains engage. The conveyer proper is made up of a succession of sections, each section consisting of a pair of members 36 and 37, preferably of plate metal and connected by a hinge-joint 38, capable of breaking in opposite directions. The forward end of the front member 36 is provided with a cross bar or rod 39, the ends of which project beyond the edges of the member 36 and are connected to the sprocket-chains in any suitable manner and also form trunnions upon which the section is pivotally hung. Suitable guide projections 40 extend at opposite edges of the member 37, and the pintle-rod 41 of the hinge 38 is also projected at opposite edges of the conveyer-section, so as to form guide projections corresponding to the projections 40. When the conveyer-sections are traveling rearwardly from the scraper, they are supported by the platform 10 and the platforms 20 and 21, whereby each section will convey a certain quantity of the excavated earth from the scraper to the box or receptacle 22.

It will of course be understood that the box or receptacle 22 is open throughout its top, and to support the conveyer-chains when passing rearwardly across the open top of the box there is provided a track consisting of rails 42, secured to the top of the frame at opposite sides of the open top of the box, the sprocket-chains 27 being adapted to travel over the tops of these rails, and thereby be carried across the box without sagging thereinto. As each conveyer-section is of course narrower than the space between the conveyer chains or belts, it is necessary to support each section during its passage across the box or receptacle, for which purpose there is provided another track made up of spaced rail members 43, secured to the front and rear of the box slightly below and between the rail members 42 in position to support the conveyer-sections at their opposite edges.

It is proposed to individually dump each conveyer-section at a predetermined point in its passage across the box or receptacle 22, so as to deposit the excavated earth therein, which is accomplished in the following manner: Mounted to slide rearwardly upon the rails 43 is a cross-head 44, which is of course shorter than the space between the rails 42. Upon each end of this cross-head is a double-ended trip device 45, which is pivotally supported intermediate of its ends, as at 46, and works between the rails 42 and 43. Each end of this trip member is notched or bifurcated, as at 47, and the top and bottom of the trip are provided with the cam portions 48. As each conveyer-section approaches the trip members its front end will ride over the upper cam portion 48 of the trips, and thereby tilt the forward member of the section, and thus slide the material thereon to the next member 37, after which the projections 41 will engage with the notches or seats 47 of the adjacent ends of the trip members. It will here be explained that when the forward end of the conveyer-section is traveling across the rear portions of the trips the weight of the section will elevate the front ends of the trips into the paths of the projections 41, and thereby insure the engagement of these members. The rearward movement of the conveyer swings the forward ends of the trip members upwardly and rearwardly, thereby elevating the middle of the conveyer-section and collapsing the same, which will result in the dumping of the excavated earth into the box or receptacle 22. The continued rearward movement of the conveyer swings the trips entirely over through a one-half rotation, whereby the other ends of the trips are brought into position for engagement by the next succeeding conveyer-section. It will now be understood that each conveyer-section is automatically collapsed and the contents thereof dumped into the box or receptacle 22 in a very simple and efficient manner without requiring any attention on the part of the driver of the machine.

One of the important features of the present invention is to provide for dumping the excavated earth into the front portion of the box or receptacle 22 until a suitable quantity has been deposited therein and then to shift the trip mechanism rearwardly, so as to dump the earth in the rear portion of the box, whereby overflow of the front of the box and choking of the conveyer is prevented. In carrying out this feature a plate or wing 49 is pivotally hung from the under side of the cross-head 44, as at 50, there being a spring 51 extending between the front of the plate and the cross-head to yieldably support the former in a downwardly and forwardly inclined position within the box or receptacle 22. A guide-rod or link 52 extends upwardly from each edge of the wing or plate and works loosely and removably in one of a series of perforations 53, formed in the adjacent rail 43. As the material collects in the front portion of the box or receptacle 22 it piles up against the front of the member 49 until the pressure thereon draws the links 52 out of the perforations 53, whereupon the pressure of the material against the member 49 shifts the cross-head 44 rearwardly until the links or dogs 52 snap into others of the perforations 53 when the cross-head has moved sufficiently to reduce the pressure of the material thereagainst. This operation is successively repeated until the cross-head has reached its rear limit and the box or receptacle has been filled.

In order that the contents of the box or receptacle 22 may be dumped or discharged, the bottom of said box is formed in independent transverse sections 54, each of which is pivoted to the side of the box adjacent its front end, as indicated at 55. The rear end of each bottom member or section is normally held in a horizontal position by means of a rope or cable 56, suitably connected to the upper side of the bottom member and running over and forwardly across a suitable guide-pulley 57, through an opening 58 in the front of the box, and around a drum or shaft 59, journaled transversely across the machine in front of the box. A suitably-constructed ratchet mechanism is provided for the windlass 59, including a controlling-lever 60, which rises above the top of the frame into a position accessible from the driver's seat 61, whereby the windlass may be rotated to wind the cables 56 thereon and hold the bottom members 54 in their normal closed positions and also to rotate the windlass in the opposite direction, so as to permit of the bottom sections being tilted downwardly by the weight of the material in the box to the dotted-line position in Fig. 2 of the drawings, and thereby permit of the excavated earth discharging downwardly through the bottom of the box.

As the conveyer passes beneath the bottom of the box it is necessary to accommodate the same to the downward tilting of the bottom sections of the box, and therefore it is proposed to have the space between the conveyer-chains and beneath the box unobstructed in order that the conveyer-sections may hang in a substantially vertical position from the chains when passing beneath the box, whereby the bottom sections of the box may tilt downwardly between adjacent sections of the conveyer without interference thereby, and thus permit of the contents of the box being discharged to the ground. It will of course be understood that the conveyer is thrown out of operation when the excavated material is being dumped or discharged, as otherwise the cross-bars 39 of the conveyer would catch upon the downwardly-tilted bottom sections 54 of the box, and thereby damage the same.

The conveyer is of course stopped by moving the clutch 32 out of engagement with the gear 31, and it is proposed to provide for controlling this clutch by means in reach from the driver's seat 61. For this purpose an upstanding lever 62 is fulcrumed intermediate of its ends, as at 63, upon the frame of the machine, with its lower end connected to the front end of the connecting-rod 64, which in turn has its rear end connected to a bell-crank 65, which is connected to the movable member of the clutch 32. The lever 62 rises above the top ply of the conveyer, and upon the upper end of the lever there is fulcrumed a substantially horizontal dog 66, the forward end portion of which is weighted to normally hold its rear downturned end 67 above and out of engagement with the adjacent sprocket-chain 27. When it is desired to stop the conveyer, the driver elevates the front end of the dog 66, so as to bring its downturned rear end 67 into engagement with one of the links of the adjacent conveyer-chain 27, whereupon the lever 62 will be actuated to move the connecting-rod 64 forwardly, and thereby release the clutch 32, which permits of the gear 31 running loosely upon the shaft 7 without operating to move the conveyer, which will then remain in a position of rest. The movement of the lever 62 under the influence of the conveyer is limited by a stop 68, and the downward movement of the forward weighted end of the dog 66 is limited by a stop 69 upon the lever 62.

When the conveyer-sections pass rearwardly beyond the box or receptacle 22, they successively engage a track member or rail 70 at each side of the machine, said track extending downwardly and beneath the shaft 29', which connects the idle sprocket-wheels 29, so as to carry the section clear of said shaft. Between the upstanding portion of the track or rail 70 and the conveyer-chain 27 there is an upstanding guard member 71, which rises to a suitable distance to permit of the front end of each conveyer-section passing over the top of the guard, while the projections 41 and 40 are designed to pass downwardly between the guard 71 and the rack 70, and thereby prevent the section from turning completely over and swinging out at the rear end of the machine. The lower end of the guard 71 is extended beneath the machine in a horizontal position and constitutes a track upon which the projections 41 and 40 travel, so as to hold the conveyer-sections in horizontal positions. This track terminates at or short of the rear end of the box or receptacle 22 in order that the conveyer-sections may drop down when passing beneath the box to enable the tilting of the bottom sections of the box, as hereinbefore described.

To enable the vertical adjustment of the scraper 8, an upstanding rack-bar 72 is loosely connected to one end of the scraper and engages a pinion 73, carried by a shaft 74, suitably journaled across the front of the machine in front of the driver's seat. This shaft is controlled by a double-acting ratchet mechanism including a handle or lever 75, which is accessible from the driver's seat, whereby the shaft 74 may be rotated in either direction to raise and lower the scraper 8. It will here be explained that the bars 13, 14, 23, and 24 have loose or pivotal connections with the frame of the machine and the scraper to enable the necessary vertical adjustment of the latter.

Having thus described the invention, what is claimed is—

1. In a machine of the class described, the combination with a receptacle, of a conveyer working thereacross and formed in successive sections, and means to successively dump the sections when passing across the receptacle.

2. In a machine of the class described, the combination with a receptacle, of a conveyer made up of a succession of independent sections, and a trip device located in the path of the sections when passing across the receptacle to successively dump the sections.

3. In a machine of the class described, the combination with a receptacle, of a conveyer made up of successive independent sections, each section having a hinge-joint intermediate of its ends and extending transversely thereof, and a trip disposed to successively break the joints of the conveyer-sections to dump the same when passing across the receptacle.

4. In a machine of the class described, the combination of a receptacle, a conveyer working thereacross and comprising spaced belts and a series of independent conveyer-sections carried thereby, each section having a hinge-joint intermediate of its ends and transversely thereof with the hinge-pintle projecting at opposite edges of the section, and a pair of rotatable trip members provided with seats located in the paths of the projected ends of the hinge-pintle and capable of being turned thereby to lift the pintle and break the joint of the conveyer-section to dump the contents thereof.

5. In a machine of the class described, the combination of a receptacle, a conveyer working across the receptacle and comprising spaced belts and a series of independent conveyer-sections pivoted therebetween, each conveyer-section having guide projections at opposite sides thereof, rails to support the conveyer-sections when passing across the receptacle, and trip members located in the paths of the projections to tilt the sections and dump the contents thereof.

6. In a machine of the class described, the combination of a receptacle, a conveyer working across the receptacle, means to cause the conveyer to dump into the receptacle, and means controlled by the accumulation of material in the receptacle to shift the position of the conveyer-dumping means to render the latter active at different successive positions.

7. In a machine of the class described, the combination of a receptacle, a conveyer working across the receptacle, a trip device for dumping the conveyer at the receptacle, and means to shift the position of the trip by the accumulation of material in the receptacle consisting of a spring-pressed element pivotally connected to the trip, and a rack and dog for said element to yieldably hold the same against the pressure of material in the receptacle, said element capable of yielding under the pressure of the collected material to disengage the dog from the rack and shift the element and the trip until the pressure is relieved and the dog reëngages the rack.

8. In a machine of the class described, the combination of a receptacle, a conveyer working across the receptacle and including individual sections capable of being dumped, spaced rails extending across the receptacle, each rail being provided with a longitudinal series of openings to constitute a rack, a cross-head movably supported upon the racks, a trip carried by the cross-head and in the paths of the conveyer-sections to individually dump the same, and means to automatically shift the cross-head upon the track consisting of a plate pivotally hung from the cross-head, a spring to yieldably support the plate in a downwardly and forwardly inclined position within the receptacle, and dogs rising from the plate into coöperative relation with the respective racks, the plate capable of yielding under the pressure of the collected material within the receptacle to disengage the dogs from the racks and permit rearward movement of the cross-head with the plate under the pressure of the material, the spring serving to return the dogs into engagement with the racks when the pressure of the material is decreased.

9. In a machine of the class described, the combination of a receptacle, a conveyer leading thereto, independent vertically-tiltable bottom sections for the receptacles, controlling-cables connected to the bottom sections, guides for the cables, and a controlling-windlass around which the cables are wound.

10. In a machine of the class described, the combination with a receptacle, of an endless conveyer working across the top and bottom of the receptacle and made up of a succession of sections pivotally connected to the belts of the conveyer, means to dump the conveyer-sections when passing across the top of the receptacle, and one or more tiltable bottom sections for the receptacle to permit dumping thereof, the sections of the conveyer being unsupported and permitted to hang downwardly when passing across the bottom of the receptacle to permit downward tilting of the bottom sections of the receptacle between adjacent conveyer-sections.

11. In a machine of the class described, the combination with a wheel-supported frame, of an endless conveyer driven from one of the wheels, a clutch included in the drive connection for the conveyer, and controlling means connected to the clutch and capable of being engaged with the conveyer to automatically release the clutch and stop the conveyer.

12. In a machine of the class described, the combination with a wheel-supported frame, of an endless conveyer driven from one of the wheels, a clutch included in the drive connection for the conveyer, a lever, a connecting-rod between the lever and the clutch, and a dog pivotally carried by the lever and capable of being engaged with the conveyer to automatically move the lever and release the clutch.

13. In a machine of the class described, the combination with a wheeled frame, of a scraper, pairs of overlapped adjustably-connected bars pivotally connected to the upper portion of the scraper and to an upper portion of the frame, other pairs of overlapped adjustably-connected bars connected to the lower portion of the scraper and the lower portion of the frame, each pair of bars being inclined upwardly and rearwardly from the scraper, and means connected to the scraper for raising and lowering the same.

In testimony that I claim the foregoing as my own I have hereto affixed my signature in the presence of two witnesses.

WILLIAM R. MARTIN.

Witnesses:
J. H. JOCHUM, Jr.,
M. C. AUERBACH.